United States Patent [19]

Fauss et al.

[11] Patent Number: 4,970,342
[45] Date of Patent: Nov. 13, 1990

[54] POLYAMINES AND A PROCESS FOR THE PRODUCTION THEREOF

[75] Inventors: Rudolf Fauss, Cologne; Hans J. Meiners, Leverkusen; Werner Rasshofer, Cologne; Holger Meyborg, Odenthal, all of Fed. Rep. of Germany

[73] Assignee: Bayer Aktiengesellschaft, Leverkusen, Fed. Rep. of Germany

[21] Appl. No.: 309,468

[22] Filed: Feb. 10, 1989

Related U.S. Application Data

[63] Continuation of Ser. No. 78,502, Jul. 28, 1987, abandoned, which is a continuation of Ser. No. 506,470, Jun. 21, 1983, abandoned.

[30] Foreign Application Priority Data

Jun. 23, 1982 [DE] Fed. Rep. of Germany ....... 3223400

[51] Int. Cl.$^5$ .......................................... C07C 209/62
[52] U.S. Cl. .................................................. 564/393
[58] Field of Search ........................................ 564/393

[56] References Cited

U.S. PATENT DOCUMENTS

| 2,888,439 | 5/1959 | Simons | 260/77.5 |
|---|---|---|---|
| 3,044,989 | 7/1962 | Shivers, Jr. | 260/77.5 |
| 3,225,094 | 12/1965 | Wolf | 564/393 |
| 3,385,829 | 5/1968 | Heydkamp et al. | 260/75 |
| 3,625,871 | 12/1971 | Traubel et al. | 260/2.5 AY |
| 3,808,250 | 4/1974 | Blahak et al. | 260/455 R |
| 3,865,791 | 2/1975 | Brinkmann et al. | 260/77.5 |
| 4,032,574 | 6/1977 | Keshi et al. | 564/393 |
| 4,039,568 | 8/1977 | Sakal et al. | 564/393 |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/68 |
| 4,224,417 | 9/1980 | Hajek et al. | 521/166 |
| 4,260,557 | 4/1981 | Mazanek et al. | 260/455 R |
| 4,260,729 | 4/1981 | Schmidt et al. | 528/68 |
| 4,386,218 | 5/1983 | Rasshofer et al. | 564/38 |

FOREIGN PATENT DOCUMENTS

| 2948419 | 8/1981 | Fed. Rep. of Germany . |
|---|---|---|
| 920475 | 3/1963 | United Kingdom . |
| 1033912 | 6/1966 | United Kingdom . |
| 1117494 | 6/1968 | United Kingdom . |

OTHER PUBLICATIONS

H. John—J. Prakt. Chemie, 130, 314 et seq.—and 332–341, (1931).

Primary Examiner—Glennon H. Hollrah
Assistant Examiner—Susan P. Treanor
Attorney, Agent, or Firm—Joseph C. Gil; Richard E. L. Henderson

[57] ABSTRACT

Polyamines containing from 0.19 to 20.3 wt. % aromatically bound primary amino groups are produced by hydrolyzing an isocyanate group containing compound in the presence of excess water, a tertiary amine and, optionally an ether solvent. The hydrolysis is carried out at a temperature of from −10° to 150° C. in a manner such that the reaction mixture remains substantially homogeneous. The isocyanate starting material contains aromatically bound isocyanate groups and has an NCO-content of from 0.5 to 40 wt. %. The ether solvent must be water soluble and inert with respect to isocyanates. Co-solvents and catalysts may also be included in the reaction mixture. The product polyamines are particularly useful in the production of polyurethanes.

10 Claims, No Drawings

POLYAMINES AND A PROCESS FOR THE PRODUCTION THEREOF

This application is a continuation of application Ser. No. 07/078,502 filed July 28, 1987 which is a continuation of application Ser. No. 06/506,470, filed June 21, 1983 (both now abandoned).

BACKGROUND OF THE INVENTION

This invention relates to a single-stage process for the production of polyamines containing aromatically bound primary amino groups by the hydrolysis of compounds containing terminal aromatic isocyanate groups (NCO-content 0.5 to 40 wt. %) in a single-stage in the presence of tertiary amines and, optionally, water-soluble ethers and, optionally, co-catalysts. The invention also relates to polyamines produced by this process.

It is known that aromatic isocyanates can be converted into primary aromatic amines by acid hydrolysis. However, this reaction does not proceed to completion because the amine formed during hydrolysis further reacts with the unreacted isocyanate to form the corresponding urea. This further reaction cannot be suppressed even by using excess, strong mineral acid. An example of such an acid hydrolysis can be found in Japanese Patent No. 55 007-827.

German Offenlegungsschrift No. 1,270,046 describes a process for the production of primary aromatic amines containing polyalkylene glycol ether segments In this disclosed process, reaction products of aromatic diisocyanates or triisocyanates with polyalkylene glycol ethers and/or polyalkylene glycol thioethers (preferably those having molecular weights of from 400 to 4000) are reacted with secondary or tertiary carbinols. The product of this reaction is subJect to thermal cleavage at elevated temperatures in an inert solvent (and optionally acid catalysts). In addition to the high cleavage temperature, the disadvantage of this process lies in the fact that the thermal cleavage of the urethanes is accompanied by formation of flammable, readily volatile alkenes which are explosive in admixture with air.

German Offenlegungsschrift No. 1,694,152 describes the production of prepolymers containing at least two terminal amino groups by reacting hydrazine, aminophenyl ethylamine or other diamines with an NCO-prepolymer of a polyether polyol and polyisocyanate (NCO:NH-ratio=1:1.5 to 1:5). In this disclosed process, unreacted amine must be carefully removed in another step because the unreacted amine both reacts with and catalyzes the reaction with polyisocyanates to a considerable extent (thereby leading to short processing times).

Another possible synthesis for polyamines containing urethane groups is described in French Patent No. 1,415,317. In this disclosed process, NCO-prepolymers containing urethane groups are converted with formic acid into the N-formyl derivatives which are then hydrolyzed to form terminal aromatic amines. The reaction of NCO-prepolymers with sulfamic acid according to German Offenlegungsschrift No. 1,155,907 also leads to compounds containing terminal amino groups. Relatively high molecular weight prepolymers containing aliphatic secondary and primary amino groups may be obtained according to German Offenlegungsschrift No. 1,215,373 by reacting relatively high molecular weight hydroxyl compounds with ammonia under pressure at elevated temperatures in the presence of catalysts. According to U.S. Pat. No. 3,044,989, reacting relatively high molecular weight polyhydroxyl compounds with acrylonitrile, followed by catalytic hydrogenation yields prepolymers having secondary and primary amino groups. Relatively high molecular weight compounds containing terminal amino groups and urethane groups may also be obtained by reacting NCO-prepolymers with enamines, aldimines or ketimines containing hydroxyl groups, followed by hydrolysis (German Auslegeschrift No. 2,546,536 and U.S. Pat. No. 3,865,791). In another possible synthesis, aromatic polyamines containing urethane and ether groups are produced by opening the ring in the reaction of isatoic acid anhydride and diols. Polyamines of this type are described, for example, in U.S. Pat. No. 4,180,644 and in German Auslegeschriften Nos. 2,019,432; 2,619,840; 2,648,774. and 2,648,825. The poor reactivity of aromatic ester amines obtained in this way is disadvantageous in numerous applications.

The reaction of nitroaryl isocyanates with polyols, followed by reduction of the nitro groups to aromatic amino groups, is also known (U.S. Pat. No. 2,888,439). The major disadvantage of this process is the high cost of the reduction step.

It is also known that certain heteroaromatic isocyanic acid esters can be converted into heteroaromatic amines by basic hydrolysis. However, the hydrolysis conditions described by H. John in J. Prakt. Chemie 130, 314 et seq. and 332 et seq (1931) for two specific, heteroaromatic monoisocyanic acid esters are both totally unsuitable for the conversion of poly-NCO-compounds into aliphatic and/or aromatic amines and dangerous.

Two of our own proposals (German Offenlegungsschrift No. 2,948,419 and P No. 30 39 600) are multistage processes for the production of polyamines. In these processes, NCO-preadducts are hydrolyzed with excess base (alkali hydroxides) to form carbamates, acidified with mineral acids or ion exchanger resins in equivalent quantities or in greater quantities exceeding the quantity of base to decompose the carbamates, optionally neutralized with base and the product polyamine isolated.

The known processes for the production of polyamines described above are all complicated. Even though our own process for converting polyisocyanates into polyamines is simpler than other prior art processes, it would still be desirable to achieve further simplification to enable polyamines to be produced economically and efficiently. It would therefore be particularly advantageous to have a single-stage process (as opposed to the customary multistage processes) for producing polyamines.

Until now, all attempts to obtain satisfactory yields of polyamines by the direct hydrolysis of polyisocyanates in a single-stage have been unsuccessful. Instead of the desired hydrolysis products, the products obtained have been only partially homogeneous, did not flow freely and contained only urea groups with very few, if any, amino groups (see Comparison Examples, infra). The reason for this appears to be that the isocyanate/amine reaction is considerably faster than the isocyanate/water reaction.

SUMMARY OF THE INVENTION

It is an object of the present invention to produce polyamines containing from 0.19 to 20.3 wt. % aromatically bound primary amino groups.

It is also an object of the present invention to provide a process for the production of polyamines containing from 0.19 to 20.3 wt. % aromatically bound primary amino groups.

It is another object of the present invention to provide a single-stage process for the production of polyamines containing from 0.19 to 20.3 wt. % aromatically bound primary amino groups.

It is a further object of the present invention to provide a single-stage one-pot process for the production of polyamines in which shorter reaction times and higher volume/time yields than prior art processes are achieved.

These and other objects which will be apparent to those skilled in the art are accomplished by hydrolyzing an isocyanate compound containing aromatically bound isocyanate groups with an excess of water in the presence of a tertiary amine and, optionally, water soluble, NCO-inert ether. The hydrolysis is carried out at a temperature of from −10° to 150° C. and in a manner such that the reaction mixture remains substantially homogeneous. This isocyanate compound has an isocyanate content of from 0.5 to 40 wt. % and is preferably an isocyanate prepolymer. Water is used in an amount which is at least twice the stoichiometrically required amount. The preferred tertiary amines include aliphatic and/or cycloaliphatic and/or araliphatic tertiary amines which are soluble in water. Co-catalysts may also be employed in the process of the present invention. Water soluble NCO-inert ether compounds are preferably used, when water-immiscible tertiary amines are employed.

DETAILED DESCRIPTION OF THE INVENTION

It has now been found that the single-stage hydrolysis of polyisocyanates leads directly to polyamines provided that the reaction is carried out in the presence of tertiary amines which accelerate the isocyanate/water reaction. This finding with respect to tertiary amines (particularly the preferred tertiary amines) is surprising because such amines are generally used as blowing catalysts in the production of polyurethane foams. More specifically, because an isocyanate group is hydrolyzed to form the amine which subsequently reacts with more isocyanates to form the urea group, it is surprising that this reaction occurs to a limited extent, if at all, in the process of the present invention. This is particularly surprising in view of the fact that considerable quantities of tertiary amines are sometimes used in the present invention.

German Offenlegungsschrift No. 1,235,439 teaches that solutions of NCO-prepolymers in dimethyl formamide may be converted into highly viscous solutions of polyurethanes with substantially equivalent quantities of water (80% to 120% of the theoretical) which conversion is accompanied by chain extension through urea groups Such viscous polyurethanes are suitable for spinning spandex filaments or for coatings.

The process of the present invention has significant advantages over conventional processes in which polyisocyanates are converted into polyamines. For example, because the carbamate does not have to be formed using alkali in a first stage carried out at a low temperature and then converted into the amine in a second stage, shorter reaction times and higher volume/time yields are achieved in the single-stage one-pot process of the present invention. Working up is also easier. Further, on completion of the reaction, tertiary amine, water and any solvent present may be separated off by distillation and/or extraction or optionally by phase separation and recycled. In a two-stage process, however, alkali salts are formed and must be filtered off and discarded or, washed out, and left behind as salt-containing effluents. Additionally, the alkali salts accumulating in conventional processes are difficult to remove from hydrophilic polyols, such as polyoxyalkylene ethers having oxyethylene sequences.

The present invention relates to a single-stage process for the production of aromatic primary polyamines by the basic hydrolysis of compounds containing aromatically bound NCO-groups. More specifically NCO-compounds containing aromatically bound NCO-groups and having an NCO-content of from 0.5 to 40 wt. %, preferably from 1.2 to 25% wt. % and, most preferably from 1.5 to 15 wt. % are hydrolyzed with excess quantities of water in the presence of tertiary amines and, optionally, in an NCO-inert water-soluble solvent of the ether series and, optionally, co-catalysts. Appropriate co-catalysts include metal catalysts: hydroxides of the Ist, IInd and/or IIIrd Main Group of the Periodic System of Elements; alkali silicates; alkali carbonates, alkali hydrogen carbonates and/or alkali and alkaline-earth metal salts of mono- or poly-carboxylic acids. The hydrolysis is carried out at temperatures in the range from −10° C. to 150° C., preferably from 65° to 130° C. and, most preferably from 90° to 105° C. In the process of the present invention, a proportion of at least 40 parts of water plus ether plus tertiary amine plus co-catalyst (preferably of at least 60 parts) are used for each 100 parts of isocyanate. A homogeneous reaction phase is maintained in a mixture at the reaction temperatures applied.

In one embodiment of the present invention, water and the (preferably water-soluble) tertiary amine are initially introduced into the reaction vessel.

A water-miscible auxiliary solvent based on ethers may be added to homogenize the reaction mixture. The water/tertiary amine mixture is gently refluxed and an NCO-prepolymer (e.g., based on a polyether) added. The reaction is accompanied by vigorous and spontaneous elimination of $CO_2$. The reaction mixture is then generally worked up by distillation. The polyamine may be obtained directly as residue (i.e., alkali or alkaline-earth metal salts do not accumulate).

In the present invention compounds containing one or more hydroxyl and/or amino and/or thiol groups attached to aliphatic, cycloaliphatic or aromatic radicals may also be used in addition to the inert ether solvent.

The present invention also relates to polyamines containing from 0.19 to 20.3 wt. %, preferably from 0.46 to 11.3 wt. %, and most preferably, from 0.58 to 4.1 wt. % aromatically bound primary amino groups obtained by the above-described process.

The present invention further relates to the use of the so prepared polyamines containing aromatically bound primary $NH_2$-groups for the production of polyurethanes and, optionally cellular polyurethane plastics and polyurethane foams. Such polyurethanes may be produced by reacting polyisocyanates and/or blocked polyisocyanates with the polyamines of the present invention and, optionally other low molecular weight and/or relatively high molecular weight compounds containing isocyanate-reactive groups, optionally in the presence of known auxiliaries and additives and/or solvents.

The NCO-compounds containing two or more aromatic free NCO-groups suitable for use in the process of the present invention (hereinafter referred to as "NCO-compounds") include: modified, aromatic polyisocyanates of the type formed by partial conversion of the isocyanate groups into urethane, urea, biuret or uret dione or isocyanurate groups: so called NCO-prepolymers of polyfunctional compounds containing NCO-reactive H-groups and having a molecular weight in the range from 62 to 12,000 and (excess) quantities of aromatic polyisocyanates; semiprepolymers of NCO-prepolymers and additional low molecular weight polyisocyanates.

Suitable modified aromatic polyisocyanates are, for example, polyisocyanates containing urethane groups (polyol-modified); polyisocyanates containing urea groups (water-modified), German Patentschrift No. 1,230,778); polyisocyanates containing biuret groups (U.S. Pat. Nos. 3,124,605 and 3,201,372, British Patent No. 889,050); polyisocyanates containing isocyanurate groups (German Patentschriften Nos. 1,022,789 and 1,222,067); and dimeric or oligomeric polyisocyanates containing uret dione groups, which are known compounds or can be obtained by known methods. Several uret dione poly-isocyanates are mentioned in Analytical Chemistry of the Polyurethanes, Vol. 16/III, High-Polymers-Series (Wiley 1969).

Modified polyisocyanates containing urethane and/or biuret and/or uret dione and/or isocyanurate groups of the type suitable for use in the process of the present invention generally have an NCO-content of from 5 to 40 wt. %, preferably from 10 to 25 wt. %, and are substantially free from urethane groups.

The NCO-compounds most preferably used in the process of the present invention are NCO-prepolymers of the type obtained by reacting low molecular weight and/or relatively high molecular weight hydroxy and/or amino and/or thiol groups as compounds containing reactive groups (molecular weight 62 to approximately 12,000) with an excess of aromatic polyisocyanates in known manner.

Aromatic polyisocyanates suitable for use in the production of the compounds containing free NCO-groups are, in principle, any aromatic and heterocyclic polyisocyanates substantially free from readily hydrolyzable groups (other than the NCO-groups) of the type described, for example, by W. Siefken in Justus Liebigs Annalen der Chemie, 562, pages 75 to 136, such as those corresponding to the formula $Q (NCO)_n$, in which $n=2$ to 4 (preferably 2) and Q represents a hydrocarbon radical containing from 4 to 15 carbon atoms or an aromatic hydrocarbon radical containing from 6 to 15 carbon atoms (preferably from 6 to 13 carbon atoms) such as 1,3- and 1,4-phenylene diisocyanate, 2,4- and 2,6-tolylene diisocyanate and mixtures of these isomers, diphenyl methane-2,4'- and/or -4,4'- and/or -2,2'-diisocyanates, including the alkyl- and chlorine-substituted derivatives, and naphthylene-1,5-diisocyanate. Other suitable diisocyanates are the 2,4'-diisocyanatodiphenyl sulfides described in German Auslegeschrift No. 2,922,966 and the alkyl-substituted diphenyl methane diisocyanates described for example in European Patent No. 24,665 and in German Auslegeschrift No. 2,935,318.

Other suitable polyisocyanates are triphenyl methane-4,4',4''-triisocyanate; polyphenyl polymethylene polyisocyanates of the type obtained by condensing aniline with formaldehyde, followed by phosgenation (described in British Patent Nos. 874,430 and 848,671); m-and p-isocyanatophenyl sulfonyl isocyanates (U.S. Pat. No. 3,454,606): perchlorinated aryl polyisocyanates of the type described in German Auslegeschrift No. 1,157,601 (U.S. Pat. No. 3,277,138); polyisocyanates containing isocyanurate groups of the type described in U.S. Pat. No. 3,001,973 and German Patent Nos. 1,022,789; 1,222,067; 1,027,394, 1,929,034 and 2,004,048; polyisocyanates containing urethane groups of the type described in Belgian Patent No. 7,522,261 or in U.S. Pat. Nos. 3,394,164 and 3,644,457; polyisocyanates containing acylated urea groups (German Patent No. 1,230,778); and polyisocyanates produced by telomerization reactions of the type described in U.S. Pat. No. 3,654,196. It is also possible to use diaryl alkylene diisocyanates obtained by the polymerization of acrylonitrile and, optionally, other ethylenically unsaturated monomers in the diaryl alkylene diisocyanates using the method described in European patent application No. 37 112 (U.S. Pat. No. 4,283,500).

In general, it is particularly preferred to use commercially available polyisocyanates such as 2,4- and 2,6-tolylene diisocyanate, and mixtures of these isomers ("TDI"); polyphenyl polymethylene polyisocyanates of the type produced by condensing aniline with formaldehyde, followed by phosgenation ("crude MDI"); and polyisocyanates containing urethane groups, isocyanurate groups or urea groups ("modified polyisocyanates"). The modified polyisocyanates derived from 2,4- and/or 2,6-tolylene diisocyanate (TDI) and from 4,4'- and/or 2,4'- and/or 2,2'-diphenyl methane diisocyanate (MDI) are most preferred. From a technical point of view, production of the NCO-prepolymers from TDI and MDI (or their isomer mixtures) is particularly advantageous.

Isocyanate reactive compounds preferably used in the production of the NCO-prepolymers are relatively high molecular weight compounds having a molecular weight in the range from 400 to 12,000 (preferably 400 to 6000) and containing at least 1.9 (preferably from 2 to 4 and most preferably, from 2 to 3) reactive hydroxyl, amino and/or thiol groups (preferably hydroxyl groups) as reactive groups per mole. Examples of such compounds are the polyacetals, polythioethers, polycarbonates, polyamides, polysiloxanes and/or polybutadienes containing isocyanate-reactive groups which are commonly employed in polyurethane chemistry, particularly polyesters, polylactones and polyethers, but most preferably polyethers containing hydroxyl groups.

The polyethers containing at least two, generally two to eight (preferably two to three) hydroxyl groups which are preferably used in accordance with the present invention are known to those in the art. Such polyethers may be obtained for example by polymerizing epoxides, such as ethylene oxide, propylene oxide, butylene oxide, tetrahydrofuran, styrene oxide or epichlorohydrin alone (for example in the presence of Lewis catalysts, such as $BF_3$), or by the addition of these epoxides (preferably ethylene oxide and propylene oxide), optionally in admixture or successively, with starter components containing reactive hydrogen atoms. Suitable starter components are water: alcohols such as ethylene glycol, 1,3- or 1,2-propane diol, trimethylol propane, glycerol, sorbitol, 4,4'-dihydroxy diphenyl propane., ammonia or amines such as aniline, ethanolamine or ethylene diamine. Sucrose polyethers and formitol-started or formose-started polyethers may also be used in the present invention. In many cases, it is preferred to use polyethers of the type which contain predominantly primary OH-groups (up to 90 wt. %, based on all the OH-groups present in the polyether).

Polybutadienes containing OH-, NH- and/or SH-groups are also suitable for use in accordance with the present invention (see, Progress Org. Coatings, Vol. 7 (3), 289–329 (1979)).

Examples of suitable polyacetals are the compounds obtainable from glycols, such as diethylene or triethylene glycol, 4,4'-dihydroxy ethoxy diphenyl methane, hexane diol and for aldehyde or compounds obtainable by the polymerization of cyclic acetals, such as trioxane.

Suitable polycarbonates containing hydroxyl groups are known to those in the art. Such polycarbonates may be obtained, for example, by reacting diols, such as 1,3-propane diol, 1,4-butane diol and/or 1,6-hexane diol, di-, tri-, and tetraethylene glycol or thiodiglycol, with diaryl carbonates, for example, diphenyl carbonate, or phosgene (German Offenlegungsschriften Nos. 1,694,080, 1,915,908 and 2,221,751; German Auslegeschrift No. 2,605,024).

Preferred polyesters of dicarboxylic acids and diols are those of adipic acid and isophthalic acid and straight-chain and/or branched diols, also lactone polyesters, preferably based on caprolactone and starter diols.

Appropriate polythioethers include the condensation products of thiodiglycol itself and/or with other glycols.

Polyhydroxyl compounds already containing urethane or urea groups and optionally modified natural polyols may also be used. Addition products of alkylene oxides with phenol-formaldehyde resins or with urea-formaldehyde resins may also be used. It is also possible to introduce amide groups into the polyhydroxyl compounds as described in German Auslegeschrift No. 2,559,372.

In accordance with the present invention, it is also possible to use polyhydroxyl compounds containing high molecular weight polyadducts and polycondensates or polymers in finely dispersed or dissolved form. Polyhydroxyl compounds such as these may be obtained by polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described in German Offenlegungsschriften Nos. 1,168,075 and 1,260,142 and in German Auslegeschriften Nos. 2,324,134; 2,423,984; 2,512,385; 2,513,815; 2,550,796; 2,550,797; 2,550,833; 2,550,862; 2,633,293 and 2,639,254. However, it is also possible in accordance with U.S. Pat. No. 3,869,413 or German Auslegeschrift No. 2,550,860 to mix an aqueous polymer dispersion with a polyhydroxyl compound and subsequently to remove the water from the mixture.

Polyhydroxyl compounds modified by vinyl polymers of the type obtained by polymerizing styrene and acrylonitrile in the presence of polyethers (U.S. Pat. Nos. 3,383,351; 3,304,273; 3,523,093; 3,110,695; German Offenlegungsschrift No. 1,152,536) or polycarbonate polyols (German Patentschrift No. 1,769,795; U.S. Pat. No. 3,637,909) are also suitable for the process of the present invention. Plastics having particularly good flameproof properties may be obtained by using polyether polyols modified in accordance with German Auslegeschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Where such modified polyhydroxyl compounds are used as starting materials for the polyamines, starting components are formed which, in the polyisocyanate-polyaddition process, frequently give polyurethane plastics having significantly improved mechanical properties.

Representatives of the above-mentioned isocyanate-reactive compounds useful in the practice of the present invention are described, for example, in High Polymers, Vol. XVI, "Polyurethanes, Chemistry and Technology", by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71. It is also possible to use mixtures of the above-mentioned compounds containing at least two isocyanate-reactive hydrogen atoms and having a molecular weight of from 400 to 12,000 (for example mixtures of different polyethers).

Other starting components which may optionally be used in the production of the NCO-prepolymers are compounds containing at least two isocyanate-reactive hydrogen atoms and having a molecular weight in the range from 18 to 399 (preferably from 62 to 399). These compounds which may contain water and/or hydroxyl groups and/or amino groups and/or thiol groups (preferably hydroxyl groups) include the compounds commonly used as chain-extending or crosslinking agents in polyurethane chemistry. Such compounds generally contain from 2 to 8 (preferably from 2 to 4) isocyanate-reactive hydrogen atoms. Mixtures of different compounds containing at least two isocyanate-reactive hydrogen atoms and having a molecular weight of from 62 to 399, may also be used. Examples of such compounds are: water, ethylene glycol, 1,2- and 1,3-propane diol, 1,4- and 2,3-butane diol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol, glycerol, trimethylol propane, 1,2,6-hexane triol, trimethylol ethane, pentaerythritol, quinitol, mannitol, sorbitol, dianhydrosorbitol, dianhydromannitol, castor oil, di-, tri- and tetra-ethylene glycol di-, tri- and tetra-propylene glycol, dibutylene glycol and higher polyethylene, polypropylene or polybutylene glycols having a molecular weight of up to 399, 4,4'-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the invention are the mixtures of hydroxy aldehydes and hydroxy ketones ("formose") or the polyhydric alcohols obtained therefrom by reduction ("formitol") which are formed in the autocondensation of formaldehyde hydrate (German Auslegeschriften Nos. 2,639,084 and 2,714,084).

Aliphatic diamines suitable for use in accordance with the present invention are, ethylene diamine, 1,4-tetramethylene diamine, 1,6-hexamethylene diamine, 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'- diaminodiphenyl methane; p-xylylene diamine; bis-(3-aminopropyl)-methyl amine; diaminoperhydroanthracenes (German Auslegeschrift No. 2,638,731) and cycloaliphatic triamines (German Auslegeschrift No. 2,614,244). Hydrazine and substituted hydrazines, for example methyl hydrazine or dihydrazide compounds, may also be used.

Examples of appropriate aromatic diamines are the diamines containing ether groups (German Auslegeschriften Nos. 1,770,525 and 1,809,172 (U.S. Pat. Nos. 3,654,364 and 3,736,295)): 2-halogen-1,3-phenylene diamines optionally substituted in the 5-position (German Auslegeschriften Nos. 2,001,772, 2,025,896 and 2,065,869); 3,3'-dichloro-4,4'-diaminodiphenyl methane; tolylene diamine; 4,4'-diamino diphenyl methane; 4,4'-diaminodiphenyl disulfides (German Auslegeschrift No. 2,404,976); diaminodiphenyl dithioethers (German Auslegeschrift No. 2,509,404); aromatic diamines substituted by alkylthio groups (German Auslegeschrift No. 2,638,760); aromatic diamines containing sulfonate or carboxylate groups (German Auslegeschrift No. 2,720,166) and the high-melting diamines (German Auslegeschrift No. 2,635,400). Examples of aliphatic-aromatic diamines are the aminoalkyl thioanilines described in German Auslegeschrift No. 2,734,574.

Other compounds which may be used, although less preferably, in the production of the NCO-compounds used as starting materials in the process of the present invention are organofunctional polysiloxanes containing two terminal isocyanate-reactive groups and structual units corresponding to the formula —O—Si(R)₂— in which R is a $C_1$-$C_4$-alkyl radical or a phenyl radical, but preferably a methyl radical. Both the pure polysiloxanes containing terminal organo-functional groups and also the siloxane polyoxyalkylene copolymers containing terminal organofunctional groups known to those in the art are suitable.

The preferred organopolysiloxanes correspond to the general formula

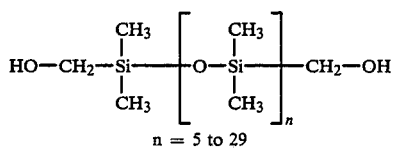

n = 5 to 29

Such organopolysiloxanes may be obtained by the equilibration of 1,1,3,3-tetramethyl-1,1,3-hydroxymethyl disiloxane, which corresponds to the formula

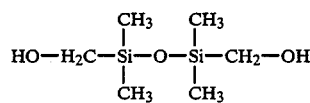

with octamethyl cyclotetrasiloxane in the presence of sulfuric acid in known manner or by the process described in German Offenlegungsschrift No. 1,236,505.

The NCO-prepolymers containing free aromatically bound isocyanate groups may be produced in known manner by reacting the reactants either in the melt or in solution. In either case, the equivalent ratio of NCO-groups to active hydrogen atoms (preferably OH-groups) is usually greater than 1 and generally between 1.5:1 and 2.8:1. It is of course possible to use an even larger excess of polyisocyanate. The NCO-prepolymers ("NCO-preadducts") generally have an oily to wax-like consistency, depending upon the starting components used. If the NCO/OH-ratio is greater than 2, primarily non-extended NCO-preadducts are obtained. If the NCO/OH-ratio is below 2, the average molecular weight of the NCO-preadducts is increased. It is also possible to use low molecular weight polyols as chain-extending agents in addition to relatively high molecular weight starting compounds in the production of the NCO-prepolymers. Where such chain-extending agents are used, relatively high molecular weight NCO-preadducts are obtained.

If the NCO-prepolymers are subjected to distillation (advantageously using a thin-layer evaporator), to remove the monomeric polyisocyanates, products containing very little, if any, monomeric polyamines are obtained.

NCO-prepolymers which have been obtained from relatively high molecular weight polyols (molecular weight 400 to 12,000), especially polyether polyols, optionally using chain-extending agents (molecular weight of 62 to 399) by reaction with aromatic diisocyanates in an equivalent ratio of from 1:1.5 to 1:2.8 (preferably from about 1:1.5 to 1:2) are preferred starting materials for the process of the present invention. The NCO-prepolymers used generally have an NCO-content of from 0.5 to 30 wt. %, preferably from 1.2 to 25 wt. %, and most preferably, from 1.5 to 10 wt. %.

However, so-called "semiprepolymers", i.e., mixtures of NCO-prepolymers with other free polyisocyanates, which may have an even higher NCO-content, for example up to 40 wt. %, may also be used in the process of the present invention. For practical and economic reasons, however, use of such mixtures is not generally advisable. The monomeric amines formed from the monomeric polyisocyanates can be particularly troublesome in a number of applications.

The compounds containing free NCO-groups in the form of their modified isocyanates (generally free from urethane groups) or in the form of their NCO-prepolymers (containing urethane groups) or their "semiprepolymers" have a total NCO-group content of from 0.5 to 40 wt. %, preferably from 1.2 to 25 wt. % and most preferably, from 1.5 to 10 wt. %.

The quantity of water should amount to at least twice the quantity of water calculated on the basis of the stoichiometic requirement of 1 mole of water for each mole of NCO-group in the hydrolysis of the NCO-compound. The quantity of water used is preferably greater than 5 times the stoichiometric quantity and, more preferably, greater than 10 times the stoichiometric quantity. The amount of water generally exceeds 1 part water for each 100 parts of NCO-compound.

The tertiary amines preferably used are those having an aliphatic and/or cycloaliphatic structure. It is also possible to use mixtures of different tertiary amines At least two and preferably all three radicals of the tertiary amine should be aliphatic, cycloaliphatic or araliphatic radicals (with bonds of the aliphatic portions). Examples of such amines which are generally not completely soluble in water are trialkylamines such as trimethylamine, triethylamine, tripropylamine, triisopropylamine, dimethyl-n-propylamine, tri-n-butylamine, triisobutylamine, triiso-pentylamine, pentylamine, dimethyl butylamine, triamylamine, trioctyl hexylamine, dodecyl dimethylamine, dimethyl cyclohexylamine, dibutyl cyclohexylamine, dicyclohexyl ethylamine; and also tertiary amines containing an araliphatic group, such as dimethyl benzylamine, diethyl benzylamine, a-methyl benzyl dimethylamine and tetramethyl-1,3-butane diamine.

It is preferred to use trialklyamines containing a total of 6 to 15 carbon atoms in all of the alkyl radicals, for example triethylamine to triamylamine and dimethyl cyclohexylamine.

In addition to trialkylamines, other suitable tertiary amines are amines which contain another tertiary amino group or an ether group, particularly in the b-position to the tertiary group. Examples of amines such as these are dialkyl aminoalkyl ethers or bis-dialkyl aminoalkyl ethers (U.S. Pat. No. 3,330,782: (German Offenlegungsschrift No. 1,030,558) including: dimethyl-(2-ethoxyethyl)-amine, diethyl-(2-methoxy-propyl)-amine, bis-(2-dimethylaminoethyl)-ether, bis-(2-diethylaminoethyl)-ether, bis-(2-diethylamino-isopropyl)-ether, 1-ethoxy-2-dimethylaminoethoxy ethane, N-methyl morpholine, N-ethyl morpholine, N-butyl morpholine. Permethylated polyalkylene diamines, such as tetramethyl ethylene diamine, tetramethyl-1,2-propylene diamine, pentamethyl diethylene triamine, hexamethyl triethylene tetramine and higher permethylated homologs (German Auslegeschriften Nos. 2,624,527 and 2,624,528), diethylaminoethyl piperidine, 1,4-diaza-(2,2,2)-dicyclooctane, N,N'-dimethyl piperazine, N,N'-diethyl piperazine, N-methyl-N'-dimethylaminoethyl piperazine, N,N'-bis-dimethylaminoethyl piperazine, N,N'-bis-dimethylaminopropyl piperazine and other bis-dialkylaminoalkyl piperazines of the type described in German Auslegeschrift No. 2,636,787 are also used.

Within this group of tertiary amines, it is preferred to use those which are water-soluble such as tetramethyl ethylene diamine, permethylated diethylene triamine, N-methyl morpholine, bis-2-dimethylaminoethyl ether and N-methyl piperidine.

It is also possible to use acylated tertiary amine derivatives such as 1-dimethylamino-3-formylaminopropane, N-(2-dimethylaminoethyl)-proprionamide, N-(2-diethylaminoethyl)-benzamide and other tertiary amines containing amide groups (e.g. formamide groups) such as those described in German Auslegeschriften Nos. 2,523,633 and 2,732,292.

Tertiary amines of relatively weak activity are tertiary amines of the pyridine type and tertiary amines containing at least one aromatic radical attached to the N-atom, for example dimethyl aniline.

If the tertiary amines used are not soluble in water, their boiling point should best be below 250° C. and preferably below 200° C.

If the tertiary amines are not completely homogeneously soluble in the reaction mixture (i.e., they are soluble in water to only a limited extent), the ether solvents may be used to promote homogenization of the reaction mixture.

In the process of the present invention, the tertiary amines are not only catalysts for the hydrolysis reaction, they also function as "solvents" when used in large quantities.

In the process of the present invention, the NCO-compounds are generally used without any solvent. However, in order to reduce viscosity, it is possible to use solutions of NCO-compounds in NCO-inert solvents, such as water-soluble ether compounds (e.g. dioxane), optionally in the presence of relatively small quantities of completely or partly water-insoluble compounds (e.g. methyl ethyl ketone, propionitrile, hydrocarbons or halogenated hydrocarbons). Compounds such as dimethyl formamide may also be used in limited quantity. Substantially homogeneous solutions should be present during the hydrolysis reaction.

The NCO-compounds are preferably used in the form of solutions in the above-mentioned solvents when the NCO-prepolymers are solid or substantially not melting or highly viscous at temperatures in the range from 20° to 100° C. In cases where liquid NCO-compounds are used without any solvent, they should be heated to between 20° and 100° C. (preferably to between 40° and 90° C.) in order to keep their viscosity low. Where solvents boiling at a temperature below the reaction temperature under normal pressure are used, the reaction should be carried out under pressure.

Preferred water-soluble water-miscible ether-based solvents are dioxane and tetrahydrofuran. However, it is also possible to use ethers of ethylene glycol or propylene glycol. The ether solvents may be diluted in small quantities with water-miscible "co-solvents" containing carboxylic acid dialkyl amide, lactam, tetraalkyl urea, sulfone, sulfoxide, phosphorus dialkyl amide, nitrile and/or ketone groups which boil at temperatures in the range from 56° to 250° C. (preferably from 80° to 200° C.) and which have a dielectric constant of at least 10. The quantity of co-solvent used should amount to less than 5 parts co-solvent for each 100 parts of isocyanate.

Suitable co-solvents include: water-soluble, aliphatic or cycloaliphatic acid amides containing from 1 to 10 carbon atoms, such as dimethyl formamide, diethyl formamide, N-methyl pyrrolidone, dimethyl acetamide, caprolactam, formamide with dimethyl formamide, dimethyl acetamide and N-methyl pyrrolidone being preferred; water-soluble, tetra-alkylated aliphatic ureas containing from 4 to 12 carbon atoms, such as tetramethyl ureas or tetraethyl urea; water-soluble, aliphatic or cycloaliphatic sulfones or sulfoxides containing from 2 to 10 carbon atoms, such as tetramethylene sulfone or dimethyl sulfoxide; water-soluble, aliphatic or cycloaliphatic phosphoric amides, such as hexamethyl phosphoric acid triamides; water-soluble acetonitrile: and water-soluble ketones, such as acetone.

Mixtures of the co-solvents may also be used. Of the co-solvents mentioned, it is preferred to use those which boil at a temperature of from 56° to 250° C. under normal pressure because this makes them easier to work up. Preferred water-miscible co-solvents are dimethyl formamide, dimethyl acetamide, N-methyl pyrrolidone, tetramethylene sulfone, acetonitrile and acetone. Dimethyl formamide and acetonitrile are particularly suitable and readily obtainable. It is less preferred to use the Zerewitinoff-active substances such as caprolactam or formamide; or substances which are not completely unreactive to amino groups such as acetone. Acceptable products are, however, obtained when these less preferred materials are used.

Solvents which are not completely miscible with water, for example propionitrile, methyl ethyl ketone, ethyl acetate or hydrocarbons, may be used in small quantities, although there is no advantage in doing so.

In practicing the process of the present invention, it is preferred that the concentration of NCO-compounds in the hydrolysis reaction mixture should be $\leq 60$ wt. %. preferably $\leq 40\%$ by weight of the reaction mixture. That is, water plus tertiary amine plus ether should amount to $\geq 40$ or preferably $\geq 60$ wt. %. The sum of isocyanate plus water plus tertiary amines plus ether should generally amount to 100%. The tertiary amine, water, and solvent should be used in a quantity such that a substantially homogeneous (at most slightly clouded) or, preferably, a homogeneous clear solution is formed at the reaction temperatures. It is also preferred that the tertiary amines be used in quantities of ≧10 parts amine to 100 parts of the NCO-compound (expressed as solids) and most preferably in quantities of from 20 to 400 parts of tertiary amine.

If the preferred water-soluble (completely water-miscible) tertiary amines are used, they are capable of acting as homogenizing solvent for the NCO-compound and the water themselves.

In cases where the tertiary amines used are not completely miscible with water, as is the case with triethylamine for example, a sufficient quantity of ether or co-solvent should be used to ensure adequate homogenization of the reaction mixture.

The polyvalent metal compounds known to be useful as catalysts in isocyanate chemistry may be used in the process of the present invention. Such compounds are preferably compounds of tin, zinc or lead. Dibutyl tin dilaurate, tin octoate and lead octoate are examples of such catalysts.

Alkali carbonates or hydrogen carbonates (for example sodium or potassium carbonate or sodium or potassium hydrogen carbonate), preferably in the form of their complexes with cyclic or acyclic, optionally nitrogen-containing crown ethers, may also be used as catalysts. The following crown ether compounds which are soluble in solvents and which contain sodium, potassium carbonate and hydrogen carbonate complexes are examples of appropriate catalysts: (1,13-bis-8-quinolyl)-1,4,7,10,13-pentaoxatridecane; 4,7,13,18-tetraoxa-1,10-diazabicyclo-(8,5,5)-eicosane; 4,7,13,16,21-pentaoxa-1,10-diazabicyclo-(8,8,5)-tricosane; 4,7,13,16,21,24-hexaoxa-1,10-diazabicylo-(8,8,8)-hexacosane; 1,4,7,10,13,16-hexaoxacyclooctadecane; and 2,5,8,11,14,17-hexaoxaoctadecane. These compounds are known and are described, for example, in a Merck Company brochure entitled "Kontakte 1/77", pages 29 et seq. Mixtures of the above-described catalytically active compounds may also be used.

In addition to tertiary amines, other suitable co-catalysts are the hydroxides of the Ist, IInd and/or IIIrd Main Groups of the Periodic System of Elements which are known to be useful as catalysts. Examples of such catalysts are sodium hydroxide, potassium hydroxide, calcium hydroxide, sodium aluminate, sodium silicate (waterglass), sodium sulfide and sodium cyanide. It is preferred that such co-catalysts be used in quantities of from 0.01 to 1 part by weight, based on isocyanate starting material.

The above-mentioned catalytically active compounds are generally added to the solution of tertiary amines, solvents and water. Addition to the compound containing isocyanate groups is possible, but not recommended.

The metal catalysts and alkali carbonates are generally used in quantities of from 0.01 to 1 part by weight while the crown ether complexes are used in quantities of from 0.1 to 10 parts by weight, based on isocyanate starting material.

To hydrolyze the NCO-compound to form polyamines having a sufficiently high amine number, it is advantageous to maintain a concentration of the NCO-compound in the reaction mixture of less than 60 wt. % (and preferably less than 40 wt. %).

The higher the degree of dilution which is selected during the hydrolysis reaction, the higher the conversion obtained. That is, the higher the amine numbers of the polyamine, the higher the conversion of the NCO-groups into $NH_2$-groups. In practice, a limit to the degree of dilution is imposed by economic considerations in the working up stage. In practice, this limit is an approximately 3% solution. If the proportion of tertiary amines is significantly increased (for example ≧20 parts), the tertiary amine acts as a solvent in addition to or instead of the ether solvent or co-solvent.

However, it is necessary to use a quantity of solvent such that, even where tertiary amines which are not completely miscible with water are used, the reaction mixture remains substantially (preferably completely) homogeneous.

In a less preferred embodiment, compounds containing "H-active groups" and two or more hydroxy, amino and/or thiol groups may be added to the reaction mixture. Compounds of this type were described previously as synthesis components for the NCO-compounds. Difunctional to optionally tetrafunctional compounds having a molecular weight in the range from 62 to 2000, particularly containing at least two primary hydroxy groups (for example ethane diol, butane diol, 1,2-propane diol, polyethylene glycols, trimethylol propane or the like) may be used. It is also possible to use compounds containing different "H-active groups" such as aminoethanols.

Compounds containing only one H-active group, for example, methanol, ethano, cyclohexanol, cyclo hexylamine, aniline. asymmetrical dimethyl hydrazine, dimethylaminopropyl amine, may be used as monofunctional chain terminators in minor quantities.

Pre-extension can occur as a secondary reaction in the process of the present invention, i.e., isocyanate and already formed amine react with chain attachment to form ureas. This secondary reaction may be largely suppressed by working in dilute solution and also by using the tertiary amines. Although it is desirable that secondary reactions of this nature should take place to the least possible extent, a certain degree of pre-extension is acceptable for economic reasons. The properties of an elastomer made from a polyamine produced by the process of the present invention in which approximately 19% of the NCO-groups reacted with amino groups in the pre-extending reaction to form ureas, did not deteriorate si-gnificantly in relation to an elastomer made from a polyamine in which substantially no pre-extending reaction occurred (see Comparison Examples infra).

The reaction of the present invention is preferably carried out in homogeneous phase. By slightly over-gauging the quantity of water or the quantity of NCO-compounds, slight clouding of the reaction mixture may be obtained because the starting materials are no longer completely dissolved. However, if the reaction is carried out in heterogeneous phase, for example, by the excessive addition of water with precipitation of the NCO-prepolymer, unsatisfactory products are obtained.

The optimal mixing ratios, which depend upon the specific starting compounds used, may readily be determined by a few preliminary tests.

The reaction may be carried out at temperatures in the range from −10° to +150° C. However, it is preferably carried out at temperatures in the range from 65° to 130° C. because the best volume/time yields coupled with high solubility are obtained at temperatures in that range. It is particularly preferred to carry out the reaction at the boiling point of the mixture which, due to the presence of water, is generally in the range from about 90° to 105° C. In some cases, it may be necessary to carry out the reaction under pressure in order to obtain sufficiently high temperatures.

The onset of the reaction is recognizable by the almost spontaneous elimination of $CO_2$. It is important to ensure that the reactants are mixed rapidly and very thoroughly. The reaction may be carried out either continuously or in batches. In one batch-type procedure, the NCO-group-containing compound may be introduced into the aqueous mixture with the tertiary amines, and optionally, ether catalysts and co-solvents. This may be done by means of a dropping funnel or, by mechanical injection using a nozzle provided that thorough distribution of the reactants is achieved, e.g., by intensive stirring.

In a continuous embodiment, which is particularly suitable for large-scale production, the NCO-compounds (optionally in the form of a solution) and the aqueous solution are separately delivered to a common reaction zone, intensively mixed (for example by means of a flow mixer) and rapidly discharged from the mixing zone. The components may be metered by means of graduated dropping funnels or by means of a piston and/or diaphragm metering pump or any other metering unit. In the case of continuous metering, it is preferred to mix, react and discharge the two components from the reaction zone very quickly (in seconds or fractions of a second) using a suitable, optionally mechanical, unit.

Various additives may be used to facilitate the reaction of the isocyanate groups with the aqueous tertiary amine phase. Thus, one or more standard commercial emulsifiers may be used in quantities of from 0.01 to 1 part by weight for each 100 parts of reaction mixture to promote homogenization. However, this is not necessary where homogeneous reaction mixtures (dissolved components) are used.

The flow mixers suitable for use in carrying out the present invention on a continuous basis may be static mixers (fixed baffles) and dynamic mixers (moving parts on the rotor/stator principle). They may be either heated or cooled. In the case of static mixers, the necessary mixing energy is generated by the pumps, whereas in the case of dynamic mixers a separate motor drives the rotor. In every case, the conversion of the isocyanate groups to amino groups also depends upon the power applied and the corresponding shear forces generated, i.e., upon the rapid, homogeneous dispersion of the NCO-compound in the reaction medium. The static mixers used may be mixers made of simple baffles (for example, coils) or complicated baffles (for example, packing mixers) or multichannel mixers. It is also possible to use mixing nozzles or the mixing chambers in the HK-machines manufactured by the Hennecke Company (Birlinghoven Federal Republic of Germany), into which the starting materials are injected under pressure (countercurrent injection). Dynamic mixers suitable for use in the process of the present invention are flow mixers which operate on the stator-rotor principle, in the same way as the known impeller homogenizers, but which cannot be used for delivery or transporting purposes. The necessary mixing energy generally amounts to between about 1 and more than 10 KW per liter of mixer volume, depending upon the degree of dispersion required, the type of mixer used and the viscosity of the starting materials.

On completion of mixing, the mixture obtained may be directly worked up into the polyamine or, alternatively, may be left to afterreact for a short time of generally less than 5 minutes. The reaction mixture is preferably refluxed gently under normal pressure in order to separate off all the carbon dioxide formed. However, the reaction mixture may also be heated for longer periods without any disadvantage.

Working up of the reaction mixture may also be carried out continuously or in batches. The reaction mixture is normally worked up by distillation, by extraction or by phase separation.

Working up by distillation normally begins without a vacuum and, depending on the boiling point of the solvents used, the volatile constituents are subsequently distilled off under reduced pressure. In general, sump temperatures (in the residual polyamine) of from 100° to about 130° C. are maintained towards the end of the concentration-by-evaporation phase.

Where a thin-layer evaporator is used, distinctly higher temperatures, for example in the range from 170° to 200° C. in the polyamine may briefly be reached.

Extraction processes after dilution with water may be carried out using water-insoluble solvents, such as methylene chloride or chlorobenzene, but are not recommended.

Phase separation of the reaction mixture by cooling occurs in some cases if hydrolysis has been carried out at relatively high temperatures and in the presence of a relatively large quantity of water at the solubility limit. Phase separation may be completed or actually brought about by the addition of water. The aqueous phase containing tertiary amine, solvent and generally the catalyst is separated off from the polyamine phase.

In general, the aqueous phase may be directly reused.

In addition to the polyamine, the polyamine phase may contain residues of the tertiary amine and a little water together with the ether solvent and co-solvents, which may be completely removed by distillation, optionally in vacuo, or by thin-layer distillation.

If the NCO-group-containing compound still contains free, i.e., monomeric, isocyanate from its production, the monomeric amine formed therefrom may accumulate to a considerable extent in the water/tertiary amine and organic solvent phase during working up by phase separation. In that case, the polyamine obtained by this simple working-up procedure is substantially free from monomer It is advisable to free the aqueous solution from monomeric amine by working up before it is re-used.

The polyamines obtained in accordance with the invention after working up are generally colorless to faintly colored, medium-viscosity to high-viscosity, optionally relatively high melting products having amino group contents of from 0.19 to 20.3 wt. %. Depending upon the starting materials, these polyamines additionally contain urethane and/or urea and/or uretdione and/or isocyanurate and/or biuret groups, and optionally, ether and/or acetal and/or carbonate and/or ester and/or thioether and/or dialkyl siloxane groups and/or residues of polybutadienes which were already present in the NCO-compounds. However, additional bonds can be formed by secondary reactions. For example, urea groups can be formed from already hydrolyzed fractions and residual NCO-groups during the hydrolysis reaction. The quantity of primary aromatic amino groups present in the polyamines corresponding at most to the quantity of NCO-groups in the NCO-compounds i.e., approximately 0.19 to 20.3 wt. %, NH$_2$, preferably from 0.46 to 11.3 wt. % NH$_2$, and most preferably, from 0.58 to 4.1 wt. % of NH$_2$.

NCO-groups attached to aliphatic radicals give highly reactive aliphatic amines as hydrolysis products which react very quickly with NCO-groups still present to form urea compounds and hence give relatively high molecular weight polyurea amines having a low NH$_2$-content Such polyurea amines are of limited practical value.

By virtue of their low vapor pressure, the aromatic polyamines obtained in accordance with the invention are preferably used as reactants for optionally blocked polyisocyanates in the production of polyurethanes (polyurethane ureas), optionally cellular polyurethane plastics or polyurethane foams. In such applications, they may even be combined with other low molecular weight (molecular weight 32 to 399) and/or relatively high molecular weight (molecular weight 400 to approximately 12,000) compounds containing iso-cyanate-reactive groups. Suitable starting components for the production of polyurethane plastics were previously described in connection with production of the prepolymers. Appropriate materials are also disclosed in German Auslegeschriften Nos. 2,302,564 and 2,432,764 (U.S. Pat. No. 3,903,679); 2,639,083; 2,512,385; 2,513,815; 2,550,796; 2,550,797; 2,550,833; 2,550,860 and 2,550,862. These publications also contain references to auxiliaries and additives of the type which may optionally be used in the production of polyurethanes. The present invention also relates to the production of polyurethane (urea)s from the polyamines produced in accordance with the present invention. They may be used, for example, for elastomers, coatings, filaments spun from melts or solutions, dispersions or as a mixture of reactive components. The polyamines of the present invention may also be used as coupling components for diazo dyes, as hardeners for epoxide and phenolic resins and in any other known reactions involving amines, such as amide or imide formation and others.

The process of the present invention is illustrated by the following Examples. Unless otherwise indicated, all the quantities are given in terms of parts by weight or percentages by weight.

EXAMPLES

The following compounds containing isocyanate groups were used in the Examples and Comparison Examples given below.

I. A prepolymer having an NCO-content of 3.5% produced from 2,4-tolylene diisocyanate and a polypropylene glycol ether having an average molecular weight of 2000 and a functionality of 2.

Ia. Prepolymer I after thin-layer distillation.

II. A prepolymer having an NCO-content of 3.5% produced from a mixture of 80% of 2,4-tolylene diisocyanate cyanate and 20% of 2,6-tolylene diisocyanate and a polypropylene glycol ether having an average molecular weight of 2000 and a functionality of 2.

III. A prepolymer having an NCO-content of 3.5% produced from 2,4-tolylene diisocyanate and a propylene glycol-started propylene oxide/ethylene oxide mixed polyether polyol having an average molecular weight of 2000, a functionality of 2 and ethylene oxide content of 20 wt. %.

IV. A prepolymer having an NCO-content of 4.5% produced from a mixture of 80% of 2,4-tolylene diisocyanate and 20% of 2,6-tolylene diisocyanate and a polypropylene glycol ether having an average molecular weight of 1500 and functionality of 2.

V. A prepolymer having an NCO-content of 3.3% produced from a mixture of 50% of 2,4'-diisocyanatodiphenyl methane and a propylene-glycol-started propylene oxide/ethylene oxide mixed polyether polyol, having an average molecular weight of 2000, a functionality of 2 and ethylene oxide content of 20 wt. %.

VI. A "thin-layered" prepolymer having an NCO-content of 2.1% produced from 2,4-tolylene diisocyanate and a trimethylol-propane-started propylene oxide polyether having an average molecular weight of 6000, a functionality of 3 and an ethylene oxide content of 13 wt. %.

VII. A prepolymer having an NCO-content of 2.8% produced from 2,4-tolylene diisocyanate and a polypropylene glycol ether having an average molecular weight of 1500 and a functionality of 2.

VIII. A prepolymer having an NCO-content of 3.5% produced from 2,4-tolylene diisocyanate and a polytetrahydrofuran having an average molecular weight of 2000 and functionality of 2.

IX. A thin-layered prepolymer having an NCO-content of 3.3% produced from a mixture of 65% of 2,4-tolylene diisocyanate and 35% of 2,6-tolylene diisocyanate and a polyester having an average molecular weight of 2000 synthesized from butane diol/ethylene glycol (50/50) and adipic acid having a functionality of 2.

COMPARISON EXAMPLES (a) 100 g of prepolymer I were added with extremely vigorous stirring to a solution of 1000 g of water and 10 ml of bis-2-dimethyl-aminodiethyl ether. After 30 minutes, a viscous, completely inhomogeneous clouded mass was obtained and was completely unuseable for further processing.

(b) 100 g of prepolymer I were added with vigorous stirring over a period of 15 minutes at 65° C. to 300 g of ethyl acetate and 50 g of water. After stirring for 1 hour at 65° C., the mixture was worked up by distillation in a water jet vacuum at a sump temperature of 120° C. A non-stirrable, rubber-like clouded mass was obtained. Its amine number was only 5.6 (mg of KOH/g)

(calculated amine number 46.7;

$$\text{NCO/NH}_2 \text{ conversion} = \frac{5.6}{46.7} = 12\% \text{ of the theoretical}).$$

(c) 100 g of prepolymer I were added with vigorous stirring over a period of 15 minutes at 90° C. to 300 g of dioxane and 50 g of water. The clear solution was kept at 85° C. for 1 hour, after which the dioxane and water were distilled off in a water Jet vacuum at a sump temperature of up to 120° C. A slightly clouded mass was obtained. This mass was still just fluid at 100° C., but assumed an almost rubber-like consistency at room temperature. Its amine number was 13.6 (mg of KOH/g) (calculated amine number: 46.7; NCO/NH$_2$ conversion ==29% of the theoretical).

The amine number was determined by the method for determining amines described in Houben-Weyl, Methoden der organischen Chemie, Vol. II (1953) pages 660/61, by titration in glacial acetic acid using perchloric acid. By acetylating the primary amine and subsequently titrating the tertiary amine with perchloric acid, it is readily possible to distinguish between the residue of catalyst (tertiary amine), if any, and the amine number (primary amine).

EXAMPLE 1

250 ml of bis-2-dimethylaminoethyl ether and 50 ml of water were heated to 90° C., followed by the addition of 100 g of prepolymer I over a period of 10 to 15 minutes with vigorous stirring. The reaction mixture was then distilled in a water jet vacuum at a sump temperature of up to 120° C. The polyamine which had an amine number of 38 (mg of KOH/g) remained behind. The yield amounted to more than 95% of the theoretical.

EXAMPLES 2a-1

The procedure used in Examples 2a-1 (in which the materials and amounts thereof used are listed in Table 1) was the same as that described in Example 1. The quantitative ratios were not optimized.

TABLE 1

| Example No. | g of pre-polymer | Quantities of bis-2-dimethyl-amino-ethyl ether used in ml | g of water | Amine number (mg of KOH/g) |
| --- | --- | --- | --- | --- |
| 2a | 100 I | 250 | 24 | 36 |
| 2b | 100 Ia | 250 | 50 | 40 |
| 2c | 100 II | 250 | 50 | 37 |
| 2d | 100 III | 250 | 50 | 36 |
| 2e | 75 IV | 250 | 50 | 37 |
| 2f | 400 III | 800 | 400 | 42 |
| 2g | 50 V | 250 | 50 | 31 |
| 2h | 100 VI | 250 | 50 | 14 |
| 2j | 100 VII | 250 | 50 | 14 |
| 2k | 100 VIII | 250 | 50 | 32 |
| 21 | 100 IX | 250 | 50 | 34 |

EXAMPLES 3a-e

The procedure for Examples 3a-e was the same as that described in Example 1, except that other tertiary amines were used. The materials and quantities used are listed in Table 2. The quantitive ratios were not optimized.

TABLE 2

| Example No. | g of pre-polymer | Quantities of tert,-amine used in ml | g of water | Amine number |
| --- | --- | --- | --- | --- |
| 3a | 100 I | 250 bis-2-dimethyl-aminoethyl ether + 1 g of Dabco | 50 | 40 |
| 3b | 100 II | 350 tetramethyl-ethylene diamine, 69% aqueous solution | — | 41 |
| 3c | 100 III | 700 solution | — | 42 |
| 3d | 100 III | 210 bis-2-dimethyl amino ethyl methylamine | 100 | 31 |
| 3e | 100 III | 420 N-methyl-morpholine | 100 | 29 |

EXAMPLE 4

100 g of prepolymer I were added with vigorous stirring over a period of 10 to 15 minutes at 5° C. to 500 ml of bis-2-dimethylamino-ethyl ether and 50 ml of water. The resulting mixture was subsequently heated in a water jet vacuum for distillation and concentrated at a sump temperature of up to 120° C. The polyamine was obtained as residue in a yield of 97% (amine number 35).

EXAMPLE 5

100 g of prepolymer III were added with vigorous stirring over a period of 10 to 15 minutes at 90° C. to 300 g of dioxane, 200 g of diethylamine and 50 ml of water. This mixture was concentrated in a water jet vacuum at a sump temperature of up to 120° C. The polyamine was obtained as residue in a yield of 93% (amine number 26).

EXAMPLE 6

211 g of bis-2-dimethylaminoethyl ether and 50 ml of water were heated to 90° C., followed by the addition with vigorous stirring of 100 g of prepolymer I. After heating for another 4 minutes, 30 ml of water were added and the mixture cooled. The two phases were separated and worked up by distillation (at a sump temperature of up to 120° C./0.1 Torr). 82 g of polyamine having an amine number of 35 were obtained. According to analysis by gas chromatography, the polyamine was substantially free from monomeric 2,4-tolylene diamine.

7 g of a dark-colored polyamine having an amine number of 85, of which approximately 2% consisted of 2,4-tolylene diamine, were obtained from the aqueous phase.

EXAMPLE 7

100 g of prepolymer II were added with vigorous stirring at 65° C. to 350 g of tetrahydrofuran, 50 ml of water and 50 g of bis-2-dimethylaminoethyl ether, followed by working up in the same way as described in Example 5. The polyamine had an amine number of 28.

EXAMPLE 8

100 g of prepolymer III were added to 550 g of tetrahydrofuran, 200 ml of triethylamine, 5 ml of bis-2-dimethylaminoethyl ethyl and 50 ml of water in the same manner as the reactants used in Example 5. The product mixture was then worked up in the same manner as the mixture of Example 5. The polyamine had an amine number of 30.

EXAMPLE 9

An NCO-prepolymer (NCO-content 6.6%), was produced from a mixture of 50% of 2,4'-diisocyanatodiphenyl methane and 50% of 4,4'-diisocyanato-diphenyl methane and a linear polypropylene glycol ether having an average molecular weight of 1600. 100 parts of this prepolymer were reacted at 70° C. with a crosslinker mixture made up of 85 parts of an aminopolyether (amine number 28), produced by the process according to the invention from an NCO-prepolymer of 2,4-tolylene diisocyanate and a linear polypropylene glycol ether having an average molecular weight of 2000 and 10 parts of diethyl tolamine (65/35 mixture of 1,3-diamino-2-4-diethyl-6-methyl methyl benzene and 1,3-diamino-2-methyl -4,6-diethyl benzene; "DETA"). The properties of the product are given in Table 3.

EXAMPLE 10

All the components and conditions were the same as in Example 9 except that the amine number of the aminopolyol was 43. The properties of the product are given in Table 3.

TABLE 3

| Example 6 | 9 | 10 |
|---|---|---|
| Chain extender | | |
| Aminopolyether (pbw) | 85 | 85 |
| (NH-number) | (28) | (43) |
| Diethyl tolamine "DETA" (pbw) | 10 | 10 |
| NCO-prepolymer (pbw) (6.6% NCO) | 100 | 100 |
| Index | 110 | 110 |
| Mixing ration (pbw) (NCO-prepolymer/chain extender mixture) | 100:87.7 | 100:76.5 |
| Tensile strength | | |
| DIN 53504 $\sigma$ 100 MPa | 3.5 | 4.0 |
| $\sigma$ 300 MPa | 6.4 | 7.2 |
| $\sigma$ 500 MPa | 3.7 | 11.5 |
| $\sigma$ at break MPa | 23.0 | 28.0 |
| Elongation % | 730 | 620 |
| Tear propagation resistance DIN 5315 (KN/m) | 24.5 | 25.5 |
| Shore hardness A DIN 53505 | 70 | 72 |
| Elasticity DIN 53512 (%) | 42 | 41 |
| Compression set DIN 53512 (34h-70° C.) (%) | 35 | 32 |
| Abrasion DIN 53516 (mm³) | 101 | 93 |
| Pouring time (sec) | 9 | 10 |
| Flex time (mins) Mo-2478 | immediately flex- resistant | immediately flex resistant |

What is claimed is:

1. A single stage process for the production of an aromatic primary polyamine comprising selectively hydrolyzing
   (a) an isocyanate compound corresponding to said aromatic primary polyamine anda containing aromatically bound isocyanate groups and having an isocyanate content of from 1.5 to 25 wt. %, wherein said isocyanate compound is an NCO-prepolymer of (i) a polyfunctional compound containing NCO-reactive hydrogen groups selected from hydroxyl, amino and thiol and having a molecular weight in the range from 62 to 12,000 and (ii) an excess, relative to the polyfunctional compound, of an aromatic polyisocyanate, wherein the prepolymer further contains unhydrolyzed groups formed by reaction of aromatically-bound isocyanate groups and the NCO-reactive hydrogen groups, with
   (b) an excess of water in the presence of
   (c) a tertiary amine in, optionally,
   (d) an ether which is substantially completely water soluble and inert with respect to isocyanate groups at a temperature of from −10° to 150° C. in a manner such that the reaction mixture remains substantially homogeneous.

2. The process of claim 1 in which the isocyanate prepolymer has been produced by reacting a polyisocyanate with a relatively high molecular weight polyhydroxyl compound and a chain extending agent containing hydrogen-active groups and having a molecular weight of from 18 to 399.

3. The process of claim 1 in which the isocyanate prepolymer is used in a quantity which is less than or equal to 60 wt. % of the reaction mixture.

4. The process of claim 1 in which the high molecular weight polyhfunctional compound used to make the prepolymer is selected from the group consisting of polyethers, polycarbonates, polyesters, polylactones, polyacetals, polythioethers, polysiloxanes and polybutadienes.

5. The process of claim 1 in which the tertiary amine (c) is selected from the group consisting of aliphatic tertiary amines, cycloaliphatic tertiary amines, araliphatic tertiary amines and mixtures thereof.

6. The process of claim 1 in which the tertiary amine (c) is soluble in water.

7. The process of claim 1 in which the tertiary amine (c) is a trialkyl amine containing a total of from 6 to 15 carbon atoms in all of the alkyl radicals.

8. The process of claim 1 in which water (b) is used in a quantity which is at least five times the stoichiometrically required amount.

9. The process of claim 1 in which the hydrolysis is carried out at a temperature of from 65° to 130° C. on a mixture containing no greater than 60 wt. % isocyanate (a).

10. A polyamine containing from 0.19 to 20.3 wt. % aromatically bound primary amino groups prepared by selectively hydrolyzing
   (a) an isocyanate compound corresponding to said aromatic primary polyamine and containing aromatically bound isocyanate groups and having an isocyanate content of from 1.5 to 25 wt. %, wherein said isocyanate compound is an NCO-prepolymer of (i) a polyfunctional compound containing NCO-reactive hydrogen groups selected from hydroxyl, amino and thiol and having a molecular weight in the range from 62 to 12,000 and (ii) an excess, relative to the polyfunctional compound, of an aromatic polyisocyanate wherein the prepolymer further contains unhydrolyzed groups formed by reaction of aromatically-bound isocyanate groups and the NCO-reactive hydrogen groups, with
   (b) an excess of water in the presence of
   (c) a tertiary amine in, optionally,
   (d) an ether which is substantially completely water soluble and inert with respect to isocyanate groups at a temperature of from −10° to 150° C. in a manner such that the reaction mixture remains substantially homogeneous.

* * * * *